3,274,311
METHOD OF MOLDING ALUMINA
David R. Watson, Benton, Kizhakke G. Hrishikesan, Little Rock, and Jerome S. Deutscher, Benton, Ark., assignors to Reynolds Metals Company, Richmond, Va., a corporation of Delaware
No Drawing. Filed Apr. 25, 1963, Ser. No. 275,496
11 Claims. (Cl. 264—63)

This invention relates to an improved method for the preparation of sintered alumina bodies. More particularly, the invention concerns a novel method for the production of high density sintered alumina involving pre-grinding alumina with a small proportion of a fatty acid.

Sintered alumina ceramic bodies are of importance in the manufacture of spark plugs, pump parts, radomes, nose cones, electronic parts, cuting tools, thread guides, and numerous other industrial applications. In these applications, sintered alumina bodies are favored because of their characteristics of high mechanical strength, high thermal conductivity, good thermal shock resistance, high temperature resistance, chemical inertness, and excellent electrical insulating and electronic properties.

High density sintered alumina bodies are conventionally produced by a method involving the steps of first grinding calcined alumina to extreme fineness in a ball mill, followed by forming an aqueous slurry of the ground alumina. It is customary to include in the aqueous slurry, one or more additives intended to impart wet strength, to improve the plasticity and bulk density of the green mix, and to act as lubricants, fluxes, and binders. Additives of this type include, for example, epoxy and acrylic type synthetic resins, waxes, polyvinyl alcohol, dextrine, and esters of saturated fatty acids. The slurry is then prepared for molding, extrusion, or injection, for removal of water, for example by spray drying, to form dense free-flowing granules. The granules are formed into a green compact by dry pressing, the finally the compact is fired at an elevated temperature to form a dense sintered body.

As is well known, the green compact shrinks in volume upon firing, and the resulting sintered alumina body attains reduced porosity. Since the final sintered body must conform to close dimensional tolerances, the ceramic fabricator wishes to achieve low shrinkage during firing, to avoid warping and drag effects. Accordingly it has been one of the problems in this art to provide a green compact having relatively high bulk density and which will possess low shrinkage upon firing. However, merely obtaining a high bulk density of the green compact as such is not advantageous unless the final sintered alumina body attains high density with low shrinkage under reasonable firing conditions. The absolute density of alumina is about 3.9, and heretofore, sintered alumina bodies containing only alumina, have not been successfully fabricated to achieve a density of 3.8 at firing temperatures below about 3000° F. Hence it has also been sought in the art to achieve low shrinkage simultaneously with firing temperatures below 3000° F.

In accordance with the present invention, it has been found, surprisingly and unexpectedly, that the objectives of forming a green alumina compact of high bulk density and low shrinkage, and of facilitating the use of firing temperatures below 3000° F. can be achieved by employing dry grinding of the lumina in the presence of a small proportion of either a saturated or an unsaturated fatty acid, or a mixture of one or more saturated and/or unsaturated fatty acids.

The saturated fatty acids which are suited for incorporation with the alumina, in accordance with the invention, include straight chain fatty acids, for example palmitic and stearic acids, but stearic acid, containing 18 carbon atoms, is preferred.

The unsaturated fatty acids which are suited for incorporation with the alumina, in accordance with the invention, include those which are mono-unsaturated, containing one double bond in the molecule, as well as poly-unsaturated acids, containing two and three double bonds in the molecule. Of such unsaturated faty acids those which contain 18 carbon atoms in the molecule, such as oleic, linoleic, and linolenic acids, are preferred.

It has been found that the proportion of total fatty acid which will develop the desired high green compact bulk density is critical, and falls within the range between about 0.5% and about 2.0%, preferably about 1%, by weight of the alumina. If less is used, the density is too low, and if more is used, milling is inadequate.

The dry ball milling of the alumina, together with the fatty acid or acids, in the proportions indicated, imparts high bulk densities both to the alumina and to green compacts compressed therefrom. In contrast, it has been found that the fatty acids when merely admixed with a previously milled alumina, in accordance with prior art methods, do not develop the desired high bulk densities.

The capability of achieving a high density alumina in accordance with the method of the invention, has the advantage of eliminating the premilling and spray drying steps outline above, with resultant economies in processing. It has the further advantage that the high density of the alumina powder permits the filling of green compact molds without the necessity of special treatments presently employed in conventional processes. The higher density thus attained in the green compact results in achieving higher fired density, as there is less air present to be removed during sintering, and the solids are in closer contact.

Recent trends in the ceramic industry have pointed toward higher fired body densities through the use of finer crystallite size alumina. The novel method of the present invention permits the use of such low-soda fine crystallite size alumian to achieve fired body densities close to absolute alumina density.

As mentioned previously, obtaining a high bulk density of the green compact must be accompanied by the achievement of high density with low shrinkage under reasonable firing conditions in the final sintered alumina body. It has been found that the method of the invention permits firing of green compacts of temperatures well below 3000° F., with attainment of high density in the final sintered body.

This high density of sintered alumina bodies almost approaching the absolute density of alumina is of great importance since it is well known that most of the desirable physical, chemical, mechanical and electrical properties of alumina ceramics are considerably enhanced as the alumina content of the ceramic bodies is increased. The sintered alumina bodies prepared in accordance with this invention are almost 99.8% pure alumina.

It should be noted, however, that the novel method of the invention is not limited to the preparation of pure alumina bodies, but is also applicable to the preparation of types of alumina bodies which may contain significant amounts of other mineral constituents.

As explained, previously, the unexpected and surprising improvement in green compact density, fired density, and low shrinkage, is obtained, in accordance with the invention by incorporating between about 0.5% and about 2.0% by weight of fatty acid in the alumina, followed by fine grinding, for example in a ball mill. If the amount used is substantially higher than 2.0%, considerable slippage occurs on grinding and the alumina is not ground to the desired particle size range, and hence no substantial improvement in the green and fired densities results. Moreover, the ground mixture is too plastic and the green compacts made therefrom do not retain a sufficiently dry consistency for convenient handling.

Thus, by adding 1% by weight of commercial oleic acid to alumina, and then grinding the mixture in a ceramic ball mill and forming a green compact from the ground mixture, a green compact bulk density of 2.75 is obtained, compared to a density of 2.35 when no oleic acid is used. On the other hand, by mix-mulling previously ground alumina with 1% of oleic acid and forming a green compact, the bulk density is only 2.53, indicating that the addition of oleic acid during ball milling in accordance with the invention is far more effective imparting a higher bulk density to the green compact than the conventional mix-mulling.

The grinding conditions influence the properties of the ground alumina containing the fatty acid. These conditions include such variables as mill speed, ratio of ball weight to material ground, and grinding time. It has been found that considerable latitude is permissible in milling conditions.

As mentioned previously, obtaining a high bulk density of the green compact must be accompanied by the achievement of high density with low shrinkage under reasonable firing conditions in the final sintered alumina body. It has been found that the method of the invention permits firing of green compacts at temperatures well below 3000° F., with attainment of high density in the final sintered body. Thus, upon firing green compacts prepared in accordance with the invention at a temperature as low as 2950° F. for one hour, the sintered alumina bodies attain a density of 3.87 with a shrinkage of only about 11%. The same material ground without the unsaturated fatty acid, compacted and fired had a density of only 3.72 and a shrinkage of 13%.

The fatty acids may be employed either in pure or in commercially available form. Thus, there may be employed, as an unsaturated fatty acid, as such or in admixture with a saturated fatty acid, the brand of commercial oleic acid available under the designation "Neo-Fat 94-04" (Armour Industrial Chemical Co., Chicago, Illinois), which has the following analysis and specification:

| Saturated acids: | (percent by weight) |
|---|---|
| Lauric C-12 | 0-0.5 |
| Myristic C-14 | 3.0-3.5 |
| Pentadecylic C-15 | 0.5 |
| Palmitic C-16 | 3.0 |
| Margaric C-17 | 1.0 |
| Stearic C-18 | Trace |
| Unsaturated acid: | |
| Myristoleic C-14 | 1.5 |
| Palmitoleic C-16 | 6.5 |
| Oleic C-18 | 73-79 |
| Linoleic C-18 | 6.5 |
| Linolenic C-18 | 1.0 |
| Titer, ° C. | 5.0 |
| Iodine value | 95.0 |
| Acid value | 199-204 |
| Saponification value | 199-205 |
| Unsaponifiable | 1.0-1.5 |

There may also be employed commercial linoleic acid of the type sold under the designation "Emersol 315" (Emery Industries, Cincinnati, Ohio), which has the following specification:

| Saturated acids: | (percent by weight) |
|---|---|
| Myristic | 1 |
| Pentadecanoic | Trace |
| Palmitic | 3 |
| Margaric | Trace |
| Stearic | Trace |
| Unsaturated acids: | |
| Linoleic, about | 62 |
| Oleic | 28 |
| Linolenic | 6 |
| Titer ° C. | 5.0 |
| Iodine value | 145-160 |
| Acid value | 195-201 |
| Saponification value | 197-208 |
| Unsaponifiable | 1.0 |

Commercial mixtures of oleic and linoleic acids are also suitable for use in the method of the invention, for example, the products sold under the desigations "Emersol 305" and "Emersol 310" (Emery Industries, Inc., Cincinnati) which have the following approximate compositions:

| | Percent by weight | |
|---|---|---|
| | Emersol 305 | Emersol 310 |
| Unsaturated Fatty Acids: | | |
| Linoleic $C_{18}H_{32}O_2$ | 54 | 56 |
| Oleic $C_{18}H_{34}O_2$ | 40 | 38 |
| Linolenic $C_{18}H_{30}O_2$ | 2 | 2 |
| Saturated Fatty Acids: | | |
| Myristic $C_{14}H_{28}O_2$ | 1 | 1 |
| Pentadecanoic $C_{15}H_{30}O_2$ | Trace | Trace |
| Palmitic $C_{16}H_{32}O_2$ | 3 | 3 |
| Margaric $C_{17}H_{34}O_2$ | Trace | Trace |
| Stearic $C_{18}H_{36}O_2$ | Trace | Trace |

The saturated fatty acid may be employed at 100% strength, or in admixture with unsaturated fatty acids up to approximately 50% of the latter, by weight, but in general a major proportion of the saturated fatty acid is preferred.

The following examples illustrate the performance of the method of the invention, but are not to be considered as limiting.

EXAMPLE 1

Using a ceramic-lined ball mill having a capacity of 1.83 gallons, and 1 inch diameter high density alumina balls in the proportion of 4,000 parts by weight of balls to 125 parts by weight of alumina, a charge of 4,000 grams of balls and 125 grams of alumina was milled for 4 hours, together with 1.26 grams of stearic acid. The alumina had the following composition:

99.75% +$Al_2O_3$ (93% alpha phase) with approximate ultimate crystal size:

| | Percent |
|---|---|
| −30 micron | 100 |
| −10 micron | 99 |
| −5 micron | 84 |
| −2 micron | 52 |
| −1 micron | 26 |
| −.5 micron | 6 |

The ground alumina was removed from the ball mill and formed into a green compact by loading 20 grams of the ground mixture into a 1 inch diameter steel die cavity and pressing dry in a hydraulic press at room temperature and a pressure of about 5,000 p.s.i. The compact was then fired at 2950° F. for 1 hour, and the shrinkage measured in accordance with standard procedure. The results were as follows:

Table 1

| Stearic acid, percent by weight of alumina | Body density (gm./cc.) | | Shrinkage (Percent) |
|---|---|---|---|
| | Green | Fired at 2,950° F. for one hour | |
| 1 | 2.73 | 3.87 | 11.0 |
| 0 | 2.35 | 3.76 | 13.3 |

EXAMPLE 2

The procedure of Example 1 was repeated using the same grade of alumina, and a total weight of fatty acid additive of 1% of the weight of alumina. Stearic acid and oleic acid were employed in admixture as the additive. The effect of varying the proportions of the two acids is shown in the following table:

Table 2

| Additive | | Body density (gms.cc.) | | Shrinkage (Percent) |
|---|---|---|---|---|
| Stearic Acid (gms.) | Neo-Fat 94-04 (gms.) | Green | Fired at 2,950° F. for one hour | |
| 0.05 | 1.21 | 2.69 | 3.85 | 11.5 |
| 0.09 | 1.17 | 2.69 | 3.85 | 11.5 |
| 0.16 | 1.10 | 2.70 | 3.86 | 11.5 |
| 0.30 | 0.96 | 2.68 | 3.86 | 11.8 |
| 0.57 | 0.69 | 2.72 | 3.86 | 11.1 |
| 0.92 | 0.34 | 2.72 | 3.87 | 11.3 |
| 1.12 | 0.14 | 2.72 | 3.86 | 11.2 |

EXAMPLE 3

Using a ceramic-lined ball mill having a capacity of 1.83 gallons, and 1 inch diameter high density alumina balls in the proportion of 4,000 parts by weight of balls to 125 parts by weight of alumina, charge of 4,000 grams of balls and 125 grams of alumina was milled for 4 hours, together with amounts of commercial oleic acid ranging from 0.5% to 3.00% by weight. The alumina had the following composition:

99.75% +$Al_2O_3$ (93% alpha phase) with approximate ultimate crystal size:

| | Percent |
|---|---|
| −30 micron | 100 |
| −10 micron | 99 |
| −5 micron | 84 |
| −2 micron | 52 |
| −1 micron | 26 |
| −.5 micron | 6 |

The ground alumina was removed from the ball mill and formed into a green compact by loading 20 grams of the ground mixture into a 1 inch diameter steel die cavity and pressing dry in a hydraulic press at room temperature and a pressure of about 5000 p.s.i. The compact was then fired at a temperature of 2950° F. for 1 hour, and the shrinkage measured in accordance with standard procedures.

The foregoing procedure was repeated using a different grade of alumina having the composition:

99.75% +alumina (87% alpha phase) with approximate ultimate crystal size:

| | Percent |
|---|---|
| −30 micron | 100 |
| −10 micron | 97 |
| −5 micron | 83 |
| −2 micron | 60 |
| −1 micron | 25 |
| −.5 micron | 2 |

The results in terms of green compact density, fired density, and shrinkage, are summarized in Table 3:

Table 3

| Oleic acid, percent by weight of alumina | Body density (gm./cc.) | | Shrinkage (Percent) |
|---|---|---|---|
| | Green | Fired at 2,950° F. for one hour | |
| (1) 93.7% ALPHA ALUMINA | | | |
| None | 2.35 | 3.72 | 13.2 |
| 0.5 | 2.55 | 3.83 | 13.0 |
| 0.6 | 2.57 | 3.82 | 12.8 |
| 0.75 | 2.60 | 3.81 | 12.4 |
| 1.00 | 2.75 | 3.87 | 11.4 |
| 1.50 | 2.74 | 3.79 | 9.8 |
| 3.00 | 2.61 | 3.78 | 12.0 |
| (2) 87% ALPHA ALUMINA | | | |
| None | 2.31 | 3.80 | 15.2 |
| 0.50 | 2.61 | 3.88 | 11.2 |
| 1.00 | 2.74 | 3.88 | 10.6 |
| 1.50 | 2.73 | 3.87 | 10.8 |
| 2.00 | 2.69 | 3.88 | 11.9 |

It will be seen from Table 3 that optimum densities and shrinkage factors were achieved at about 1% additions of oleic acid.

EXAMPLE 4

The procedure of Example 3 was repeated using the 93% alpha grade of alumina, but varying the ratio of ball weight to alumina and the grinding time, to illustrate the effect of change in grinding conditions. The results are summarized in Table 4:

Table 4

| Grinding conditions | | | Body density, gm./cc. | | Shrinkage, percent |
|---|---|---|---|---|---|
| Alumina, gms. | Ball charge, gms. | Grinding time, hrs. | Green | Fired at 2,950° F. for 1 hr. | |
| 125 | 4,000 | 4 | 2.75 | 3.87 | 11.4 |
| 500 | 4,000 | 10 | 2.68 | 3.78 | 10.9 |
| 1,000 | 4,000 | 10 | 2.51 | 3.62 | 11.9 |

EXAMPLE 5

The effect of grinding alumina of 93% alpha grade with and without unsaturated fatty acid was determined by repeating the grinding procedure of Example 3 with and without addition of 1% of oleic acid. The bulk density in lbs. per cu. ft. was then measured. The results are shown in Table 5:

Table 5.—Bulk density lbs./cu. ft.

| No additive | | 1% oleic acid (Neo-fat 94-04) | |
|---|---|---|---|
| Loose | Packed | Loose | Packed |
| 51.8 | 98.7 | 78.5 | 130.1 |

The remarkable increase in bulk density of ground alumina may readily be seen from the table.

EXAMPLE 6

The procedure of Example 3 was repeated using various grades of commercial linoleic acid, as disclosed above, and using 93% alpha content alumina. The results using 1% by weight of the linoleic acid, are summarized in Table 6:

Table 6

| Additive percent of weight of alumina | | | Body density, gm./cc. | | Shrinkage, percent |
|---|---|---|---|---|---|
| Emersol 315 | Emersol 305 | Emersol 310 | Green | Fired at 2,950° F. for 1 hr. | |
| None | None | None | 2.35 | 3.72 | 13.3 |
| 1% | | | 2.64 | 3.84 | 12.2 |
| | 1% | | 2.66 | 3.86 | 12.1 |
| | | 1% | 2.68 | 3.87 | 12.0 |

What is claimed is:

1. Process for the manufacture of a sintered alumina body which comprises the steps of forming a mixture of alumina and from about 0.5% to about 2.0% by weight of the alumina of at least one fatty acid, finely and intimately dry grinding said mixture, forming the ground mixture into a green compact, and firing said compact at a temperature not in excess of about 3000° F. to obtain said sintered alumina body.

2. Process for the manufacture of a sintered alumina body which comprises the steps of forming a mixture of alumina and from about 0.5% to about 2.0% by weight of the alumina of a fatty acid containing 18 carbon atoms, finely and intimately dry grinding said mixture, forming the ground mixture into a green compact, and firing said compact at a temperature not in excess of about 3000° F. to obtain said sintered alumina body.

3. Process for the manufacture of a green compact adapted upon firing to form with low shrinkage of a high density sintered alumina body, which comprises forming a mixture of alumina and from about 0.5% to about 2.0% by weight of the alumina of at least one fatty acid, finely and intimately dry grinding said mixture by ball milling, and molding said ground mixture under pressure into a compact.

4. The process of claim 1 in which the alumina is a low-soda content, fine crystallite size alumina.

5. Process for the manufacture of a sintered alumina body which comprises the steps of forming a mixture of alumina and from about 0.5% to about 2.0% by weight of the alumina of stearic acid, finely and intimately dry grinding said mixture, forming the ground mixture into a green compact, and firing said compact at a temperature of about 2950° F. to obtain said sintered alumina body.

6. Process for the manufacture of a sintered alumina body which comprises the steps of forming a mixture of alumina and a total of from about 0.5% to about 2.0% by weight of the alumina of a saturated fatty acid and an unsaturated fatty acid finely and intimately dry grinding said mixture, forming the ground mixture into a green compact, and firing said compact at a temperature not in excess of about 3000° F. to obtain said sintered alumina body.

7. The process of claim 1 in which the amount of fatty acid is about 1%.

8. The process of claim 1 in which the grinding period is about 4 hours.

9. The process of claim 6 in which the saturated fatty acid is stearic acid and the unsaturated fatty acid is oleic acid.

10. Process for the manufacture of a sintered alumina body which comprises the steps of forming a mixture of alumina and from about 0.5% to about 2.0% by weight of the alumina of at least one unsaturated fatty acid containing 18 carbon atoms, finely and intimately dry grinding said mixture, forming the ground mixture into a green compact, and firing said compact at a temperature not in excess of about 3000° F. to obtain said sintered alumina body.

11. Process for the manufacture of a sintered alumina body which comprises the steps of forming a mixture of alumina and from about 0.5% to about 2.0% by weight of the alumina of oleic acid, finely and intimately dry grinding said mixture, forming the ground mixture into the green compact, and firing said compact at a temperature of about 2950° F. to obtain said sintered alumina body.

References Cited by the Examiner

UNITED STATES PATENTS

| 1,934,091 | 11/1933 | Reichman | 264—333 XR |
| 2,358,002 | 9/1944 | Dearing et al. | 106—38.7 XR |
| 2,847,710 | 8/1958 | Pitzer | 264—109 |
| 2,930,762 | 3/1960 | Schoenberger | 252—430 |
| 2,947,056 | 8/1960 | Csordas et al. | 264—56 |
| 2,960,747 | 11/1960 | Dungan | 264—333 |
| 3,116,350 | 12/1963 | Stoddard et al. | 264—86 |

FOREIGN PATENTS

| 482,355 | 6/1936 | Great Britain. |
| 492,577 | 9/1938 | Great Britain. |

ROBERT F. WHITE, *Primary Examiner.*

ALEXANDER H. BRODMERKEL, *Examiner.*

J. A. FINLAYSON, *Assistant Examiner.*